United States Patent
Razoumov et al.

(10) Patent No.: US 7,822,041 B2
(45) Date of Patent: *Oct. 26, 2010

(54) METHOD AND APPARATUS FOR SCHEDULING PACKET DATA TRANSMISSIONS IN A WIRELESS COMMUNICATION SYSTEM

(75) Inventors: Leonid Razoumov, San Diego, CA (US); Jack M. Holtzman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 898 days.

This patent is subject to a terminal disclaimer.

(21) Appl. No.: 11/040,743

(22) Filed: Jan. 21, 2005

(65) Prior Publication Data

US 2005/0129063 A1   Jun. 16, 2005

Related U.S. Application Data

(63) Continuation of application No. 09/728,239, filed on Nov. 30, 2000, now Pat. No. 6,847,629.

(51) Int. Cl.
*H04J 3/16* (2006.01)
*H04J 3/22* (2006.01)
*H04W 4/00* (2009.01)
*H04W 72/00* (2009.01)

(52) U.S. Cl. .......... 370/395; 370/329; 370/468; 455/452

(58) Field of Classification Search ......... 370/252–310, 370/329–349, 444–468, 389–395; 455/450–464
See application file for complete search history.

(56) References Cited

U.S. PATENT DOCUMENTS 4,763,322 A   8/1988   Eizenhofer et al.

(Continued)

FOREIGN PATENT DOCUMENTS

DE   19751110   5/1999

(Continued)

OTHER PUBLICATIONS

A. Jalali, et al. "Data Throughput of CDMA-HDR a High Efficiency-High Data Rate Personal Communication Wireless System," IEEE VTC2000, QUALCOM inc., San Diego CA 2000 pp. 1854-1858.

(Continued)

*Primary Examiner*—M. Phan
(74) *Attorney, Agent, or Firm*—Rupit M. Patel

(57) ABSTRACT

A method (18) for scheduling packet data transmissions in a wireless communication system wherein a per-user Priority Function (PF) (24) is based on a channel condition indicated by a Rate Request Indicator (RRI). The method also considers fairness criteria dictated by predetermined Quality of Service (QOS) requirements. In one embodiment, the rate request indicator is a Data Rate Request (DRR). In another embodiment, the rate request indicator is Carrier-to-Interference (C/I) information. In the exemplary embodiment, the base station calculates a Priority Function (PF) for the multiple mobile users. Each PF is a function of the rate request indicator and the projected throughput of a given mobile user. The PF values allow the base station to schedule active mobile units having pending data. The scheduling produces an approximately equal share of the allocated transmission time to the multiple mobile stations.

27 Claims, 4 Drawing Sheets

U.S. PATENT DOCUMENTS

| | | | |
|---|---|---|---|
| 5,101,501 | A | 3/1992 | Gilhousen et al. |
| 5,226,045 | A | 7/1993 | Chuang |
| 5,287,347 | A | 2/1994 | Spanke |
| 5,442,625 | A | 8/1995 | Gitlin et al. |
| 5,499,238 | A | 3/1996 | Shon |
| 5,583,869 | A | 12/1996 | Grube et al. |
| 5,619,492 | A | 4/1997 | Press et al. |
| 5,648,955 | A | 7/1997 | Jensen et al. |
| 5,671,218 | A | 9/1997 | I et al. |
| 5,729,534 | A | 3/1998 | Jokinen et al. |
| 5,734,646 | A | 3/1998 | I et al. |
| 5,745,480 | A | 4/1998 | Behtash et al. |
| 5,856,971 | A | 1/1999 | Gitlin et al. |
| 5,859,835 | A | 1/1999 | Varma et al. |
| 5,903,554 | A | 5/1999 | Saints |
| 5,914,950 | A | 6/1999 | Tiedmann, Jr. et al. |
| 5,923,656 | A | 7/1999 | Duan et al. |
| 5,970,062 | A | 10/1999 | Bauchet |
| 5,978,657 | A | 11/1999 | Suzuki |
| 5,996,019 | A | 11/1999 | Hauser et al. |
| 6,052,408 | A | 4/2000 | Trompower et al. |
| 6,075,792 | A | 6/2000 | Ozluturk |
| 6,088,335 | A | 7/2000 | I et al. |
| 6,091,717 | A | 7/2000 | Honkasalo et al. |
| 6,128,322 | A | 10/2000 | Rasanen et al. |
| 6,252,854 | B1 | 6/2001 | Hortensius et al. |
| 6,400,699 | B1 | 6/2002 | Airy et al. |
| 6,411,617 | B1 | 6/2002 | Kilkki et al. |
| 6,421,335 | B1* | 7/2002 | Kilkki et al. ............. 370/342 |
| 6,445,707 | B1 | 9/2002 | Iuoras et al. |
| 6,466,797 | B1 | 10/2002 | Frodigh et al. |
| 6,542,736 | B1 | 4/2003 | Parkvall et al. |
| 6,574,211 | B2 | 6/2003 | Padovani et al. |
| 6,590,890 | B1* | 7/2003 | Stolyar et al. ............. 370/349 |
| 6,597,913 | B2* | 7/2003 | Natarajan ............. 455/452.1 |
| 6,657,980 | B2* | 12/2003 | Holtzman et al. ......... 370/329 |
| 6,788,687 | B2* | 9/2004 | Bao et al. ................. 370/394 |
| 6,807,426 | B2* | 10/2004 | Pankaj ..................... 455/453 |
| 6,847,629 | B2* | 1/2005 | Razoumov et al. ......... 370/349 |
| 6,885,868 | B1 | 4/2005 | Naim et al. |
| 7,027,392 | B2* | 4/2006 | Holtzman et al. ......... 370/230 |
| 7,110,786 | B2* | 9/2006 | Moulsley et al. ........... 455/522 |
| 7,158,796 | B2* | 1/2007 | Tiedemann et al. ......... 455/453 |
| 7,197,319 | B2* | 3/2007 | Tiedemann et al. ......... 455/453 |
| 7,245,595 | B2 | 7/2007 | Kim et al. |
| 7,283,482 | B2* | 10/2007 | Koo et al. ................. 370/252 |
| 7,295,513 | B2* | 11/2007 | Elliott et al. ............. 370/229 |
| 7,463,631 | B2* | 12/2008 | Bao et al. ................. 370/394 |
| 2002/0137521 | A1* | 9/2002 | Kim et al. ................. 455/453 |
| 2003/0133457 | A1* | 7/2003 | Ono et al. ............. 370/395.4 |
| 2004/0023661 | A1* | 2/2004 | Pi et al. ..................... 455/450 |
| 2004/0062219 | A1* | 4/2004 | Holtzman et al. ........... 370/329 |
| 2004/0228349 | A1* | 11/2004 | Vrzic et al. ............. 370/395.4 |
| 2005/0002352 | A1* | 1/2005 | Bao et al. ................. 370/328 |
| 2005/0111361 | A1* | 5/2005 | Hosein ..................... 370/230 |
| 2005/0129063 | A1 | 6/2005 | Razoumov et al. |
| 2005/0195843 | A1* | 9/2005 | Ahmed et al. ............. 370/411 |
| 2005/0201281 | A1* | 9/2005 | Damnjanovic et al. ...... 370/230 |
| 2005/0226199 | A1* | 10/2005 | Kimura ..................... 370/345 |
| 2005/0232193 | A1 | 10/2005 | Jorgensen |
| 2007/0081498 | A1* | 4/2007 | Niwano ..................... 370/335 |

FOREIGN PATENT DOCUMENTS

| | | |
|---|---|---|
| DE | 19907085 | 4/2000 |
| EP | 0917317 | 5/1999 |
| EP | 0977402 | 2/2000 |
| EP | 1003302 | 5/2000 |
| EP | 1130872 | 5/2000 |
| EP | 1089500 | 4/2001 |
| WO | 9842108 | 9/1998 |
| WO | 9845966 | 10/1998 |
| WO | 9859523 | 12/1998 |
| WO | 9912304 | 3/1999 |
| WO | 0025483 | 5/2000 |
| WO | 0041542 | 7/2000 |
| WO | 0163851 | 8/2001 |
| WO | 0171926 | 9/2001 |
| WO | 0225867 | 3/2002 |
| WO | 02085054 | 10/2002 |

OTHER PUBLICATIONS

Paul Bender, et al., "CDMA/HDR: A Bandwidth-Efficient High-Speed Wireless Data Service for Nomadic Users," IEEE Communications Magazine, QUALCOMM, Inc. San Diego. CA Jul. 2000, pp. 70-77.

International Search Report, PCT/US01/043618, International Search Authority, EPO, Jan. 28, 2003.

Andrews et al. "Providing Quality of Service Over a Shared Wireless Link," IEEE Communications Magazine 39(2):150-154 (Feb. 2001).

Bender et al., Flow and Stretch Metrics for Scheduling Continuous Job Streams In Proc IX Ann. ACM-SIAN Symp. Discrete Algorithms, pp. 270-279, San Francisco, CA (Jan. 1998).

Joshi, et al, "Downlink Scheduling in CDMA Data Networks" ACM Mibicom 2000, pp. 179-190.

Shakkottai et al., "Scheduling Algorithms for a Mixture of Real-time and Non-Real-Time Data in HDR," Mathematical Science Research ctr, Bell Labs, Lucent Technologies, Murray Hill, NJ, 17th Intrnl Teletraffic Congress Salvador da Bahia, pp. 1-20, Sep. 2001.

Shakkottai et al., "Scheduling for Multiple Flows Sharing a Time-Varying Channel: The Exponential Rule," Bell Labs, Coordinated Science Laboratory, University of Illinois; Lucent Technologies, Murray Hill, NJ 07974 Dec. 23, 2000.

Mirriam Webster's Collegiate Dictionary, 10th Ed., 1997, p. 927.

International Preliminary Examination Report, PCT/US01/043618, International Search Authority, European Patent Office, Jan. 28, 2003.

* cited by examiner

METHOD AND APPARATUS FOR SCHEDULING PACKET DATA TRANSMISSIONS IN A WIRELESS COMMUNICATION SYSTEM

CLAIM OF PRIORITY UNDER 35 U.S.C. §120

The present Application for Patent is a Continuation of patent application Ser. No. 09/728,239, entitled "Method and Apparatus for Scheduling Packet Data Transmissions in a Wireless Communication System" filed Nov. 30, 2000, issued as U.S. Pat. No. 6,847,629, and assigned to the assignee hereof and hereby expressly incorporated by reference herein.

BACKGROUND

1. Field

The present invention relates to wireless data communication. More particularly, the present invention relates to a novel and improved method and apparatus for scheduling packet data transmissions in a wireless communication system.

2. Background

In a wireless communication system, a base station communicates with multiple mobile users. Wireless communications may include low delay data communications, such as voice or video transmissions, or high data rate communications, such as packetized data transmissions. U.S. Pat. No. 6,574,211, entitled "METHOD AND APPARATUS FOR HIGH RATE PACKET DATA TRANSMISSION," issued Jun. 3, 2003, describes high rate packet data transmissions, and hereby expressly incorporated by reference.

Packet data transmissions are not required to be low latency transmissions, and therefore allow the base station flexibility in scheduling mobile user transmissions within a system. Once scheduled, the base station may transmit data to as little as a single mobile user during a given time period. In general, scheduling of packet data mobile users in a system has two goals. The first goal is to optimize the utilization of each channel. The second goal is to allocate transmissions to mobile users fairly. The two goals sometimes compete. For example, channel quality conditions and the amount of pending data for a given user may result in excessive time allocations to that user particularly at the expense of other users.

There is a need, therefore, for a fair method for scheduling packet data transmissions to mobile users that is channel-sensitive.

SUMMARY

The disclosed embodiments provide a novel and improved method for scheduling packet data transmissions in a wireless communication system. In one aspect, in a wireless communication system adapted for packet data transmissions, a method includes receiving rate request indicators for a plurality of mobile stations, calculating priority function values for the plurality of mobile stations in response to the rate request indicators, and scheduling transmissions to the mobile stations according to the priority function value.

According to another aspect, a wireless apparatus includes a priority factor calculation unit adapted to receive data rate requests from mobile stations and generate power factor values in response, and a scheduling unit coupled to the priority factor calculation unit, the scheduling unit adapted to schedule data transmissions.

According to still another aspect, a method for scheduling packet data transactions in a wireless communication system includes determining a pool of users, calculating a priority function of at least a portion of the pool of users, scheduling a first set of users having pending data transactions from the portion of the pool of users, receiving rate request indicators from the portion of the pool of users, and updating priority functions of the first set of users in response to the rate request indicators.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein.

DETAILED DESCRIPTION OF THE PREFERRED EMBODIMENTS

In an exemplary embodiment of the present invention, a base station of a spread-spectrum wireless communication system schedules packet data transmissions to mobile users based upon the instantaneous values of a per-user Priority Function (PF). The user scheduling priority is related to the PF value, wherein a high PF value indicates a high scheduling priority and a low PF value indicates a low priority. In one aspect, a method for determining PF values is based on a channel condition indicated by a Rate Request Indicator (RRI). The method also considers a fairness criteria dictated by the Quality Of Service (QOS) requirements. Such a method provides robust protection against non-zero buffer under-runs on the transmitter side. In one embodiment, the rate request indicator is a Data Rate Request (DRR). In another embodiment, the rate request indicator is Carrier-to-Interference (C/I) information. Alternate embodiments may implement other types of rate request indicators or predictors. In the exemplary embodiment, the base station calculates a Priority Function (PF) for the multiple mobile users. Each PF is a function of the rate request indicator and the projected throughput of a given mobile user. The PF values allow the base station to schedule active mobile units having pending data. The scheduling produces an approximately equal share of the allocated transmission time to the multiple mobile stations.

Scheduling allocation improves channel sensitivity by reducing adverse effects associated with assigned data rates. Actual data rate assignments provide quantized transmission rates. This results in a coarse adjustment of data rates within a system. Actual data rates may be truncated, or otherwise manipulated, to conform to the assigned and available data rates. By using a rate request indicator to determine a transmission data rate, the data rate is adjusted according to the actual requirements and operating environment of the system.

Figure 1:
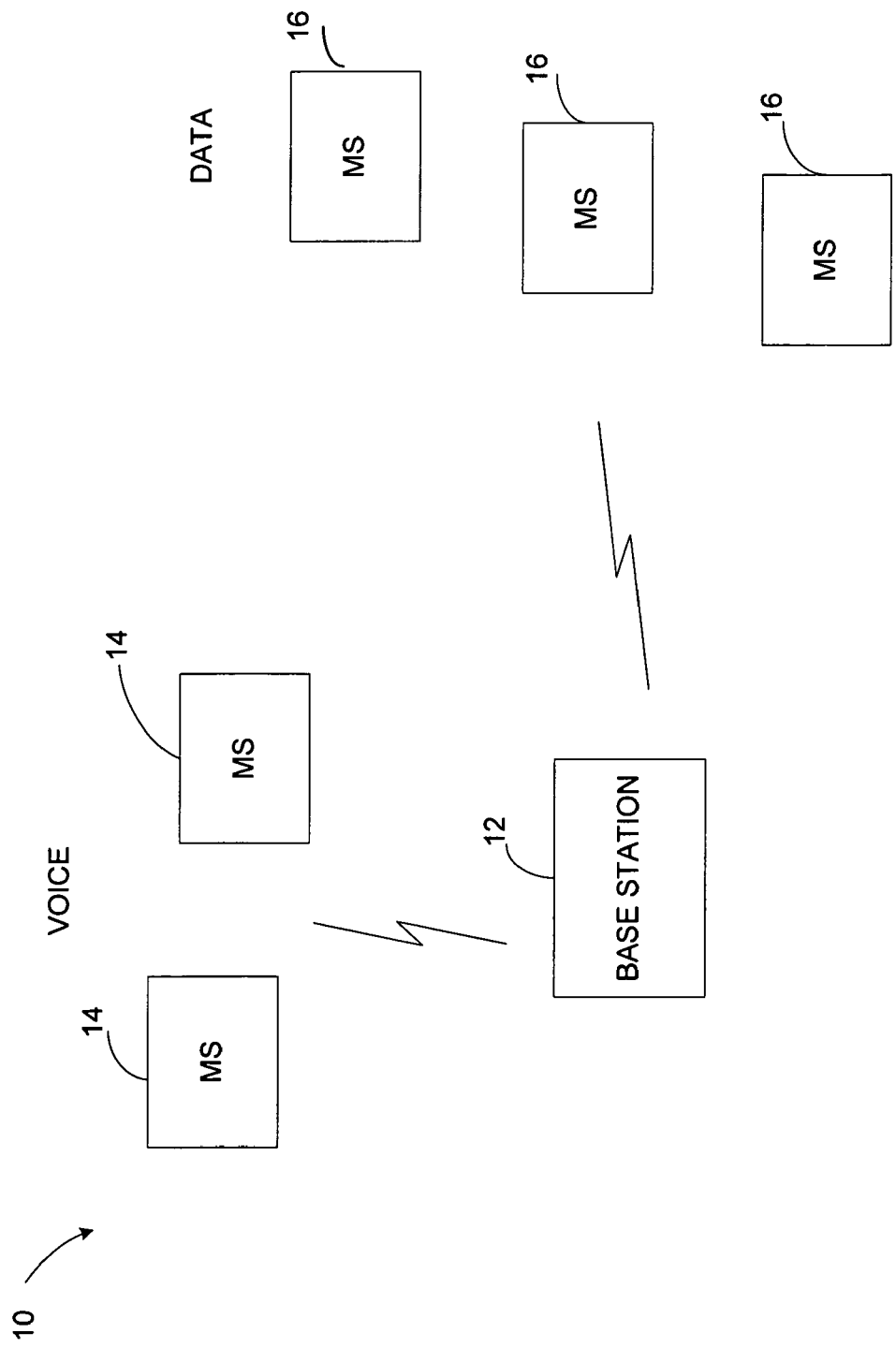
FIG. 1 illustrates in block diagram form a wireless communication system according to one embodiment.

In an exemplary embodiment illustrated in FIG. 1, a wireless communication system 10 includes a base station 12 that communicates with mobile stations 14 and mobile stations 16 via an air interface or radio link. The base station 12 processes separate transmissions for each of mobile stations 16. As illustrated, mobiles stations 14 are employing low delay data communication type services, such as voice communications, while mobile stations 16 are employing high rate packet data communications. Communications between base station 12 and mobile stations 14 are performed in real-time and therefore all active communications are performed simultaneously and concurrently. In contrast, packet data communications with mobile stations 16 may be scheduled, wherein communications to multiple mobile stations 16 are transmitted simultaneously at a given time. Alternate embodiments may allow concurrent transmissions to more than one of mobile stations 16 seeking to optimize channel utilization.

Figure 2:
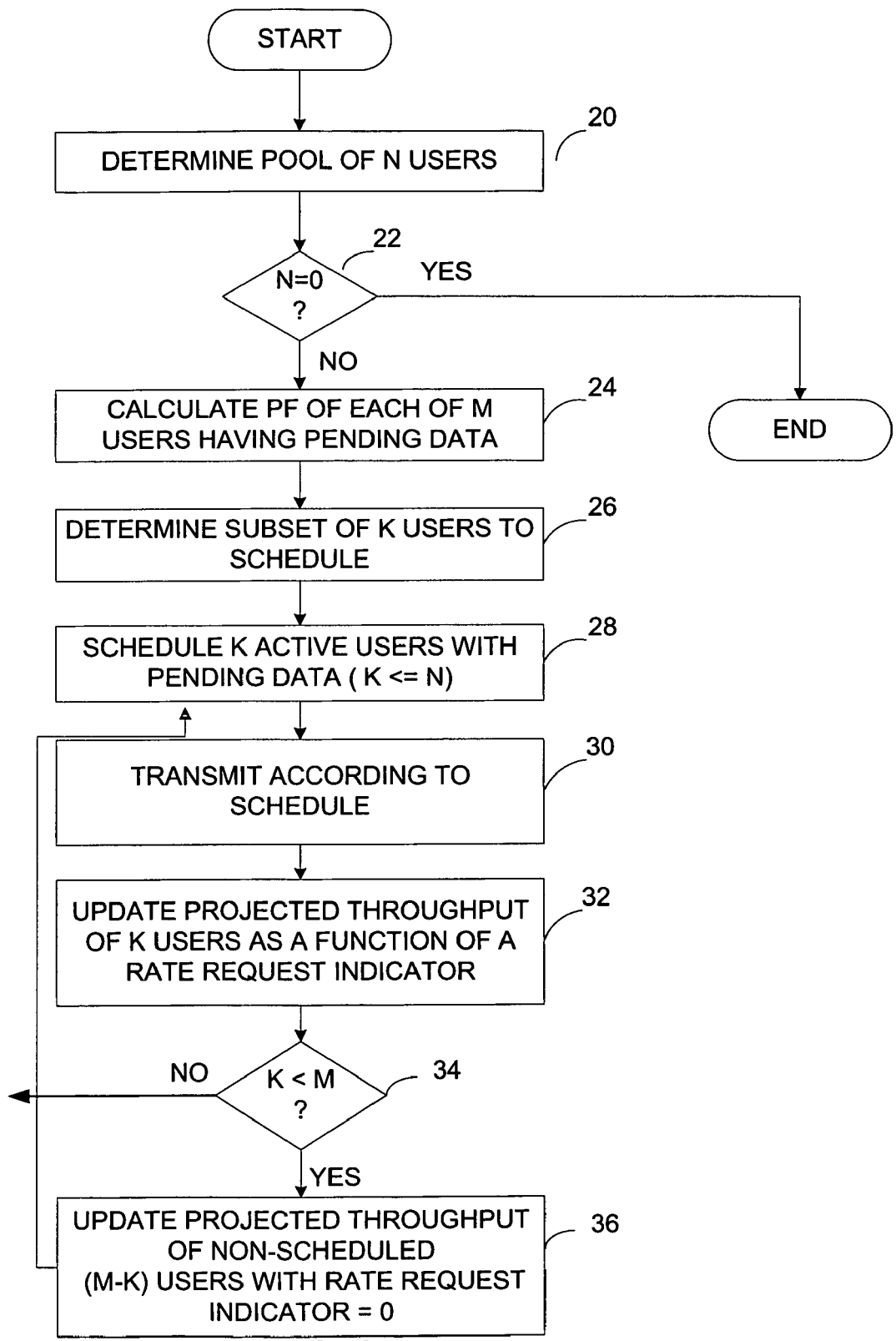
FIG. 2 illustrates in flow diagram form a method for scheduling packet data transmission in a system as in FIG. 1 according to one embodiment.

FIG. 2 illustrates a method 18 for scheduling mobile stations 16 within system 10. The process begins by determining a pool of active mobile users within system 10 at step 20. The total number of mobile stations 16, or users, in the pool is designated as "N." If N is equal to 0, at step 22, the process ends, else the process continues to step 24 to calculate a PF for each of a subset of "M" users within the pool, wherein the M active users have data pending. The PF calculation is performed according to the following equation:

$$PF(j) = \frac{DRR(j)}{T'(j)}, \text{ for } j = 1, \ldots, M, \qquad (1)$$

wherein j is a user index corresponding to the M active users with pending data. In the exemplary embodiment, a rate request indicator is implemented as DRR(j), the Data Rate Request (DRR) received from user j, for j=1, ..., M. Having the channel-sensitive rate request indicator in the numerator provides proportionality to the scheduling of users in system 10. The rate request indicator is then divided by a projected throughput associated with each user j, T'(j). The actual throughput of each user, j, may be represented as T(j), although the actual throughput is not used directly in this calculation of Equation (1).

From the subset of M active users with data pending, at step 26, a further subset is determined of "K" users to be scheduled for transmission. In the exemplary embodiment, the subset of K users is determined according to system configuration and a predetermined scheduling policy. Often K=1, or K is constrained to a single user. However, K may be any number less than or equal to M. Based on the calculated PF values, the base station schedules "K" users at step 28. Note that the K scheduled users constitute a subset of the N active users, i.e., (K≦M≦N). The base station 12 then transmits packet data transmissions at step 30 according to the schedule of step 28. Transmission involves determination of transmission power, power control, data rate, modulation, and other parameters of transmission. Note that concurrently, the base station 12 may be transmitting low latency transmissions to mobile stations 14.

At step 32, the base station 12 updates each projected throughput, T', for each of the K scheduled users as a function of a corresponding rate request indicator received from each scheduled user. The following formula describes the T' update calculation for scheduled users according to the exemplary embodiment:

$$T'(j,n+1)=(1-\alpha)\cdot T'(j,n)+\alpha\cdot DRR(j) \qquad (2)$$

wherein α is a time constant of a smoothing filter used for scheduling, for digital samples having index n. In one embodiment, the time constant may be related to the targeted QOS and/or velocity of each mobile station 16. In the exemplary embodiment, a rate request indicator is implemented as DRR(l), the Data Rate Request (DRR) received from user l, for l=1, ..., N. Having the channel-sensitive rate request indicator in the numerator provides proportionality to the scheduling of users in system 10. The rate request indicator is then divided by a projected throughput associated with each user j, T'(j). The actual throughput of each user, j, may be represented as T(j), although the actual throughput is not used directly in this calculation of Equation (1). Rather, the scheduling method makes a prediction or projection of the throughput of each user based on the rate request indicator received from that user. The rate request indicator may be the DRR transmitted via a Data Rate Control (DRC) channel, wherein the user determines a quality of the transmission channel and determines a corresponding data rate to request. The quality of the transmission channel may be a C/I measure of transmissions received by the user, wherein a corresponding DRR is associated with the C/I ratio, such as via a lookup table. In one embodiment, the user sends the C/I ratio to the base station 12 and the base station 12 determines a data rate based on the C/I. Alternately, the user may determine the data rate to request based on errors in transmitted data received by the user. The user may use a variety of methods to determine a data rate to request of the base station. Similarly, the user may implement a variety of rate request indicators for requesting a data rate from the base station. Still further, in one embodiment, different mobile stations 16 implement different rate request indicators.

If K<M at step 34 processing continues to step 36 to update each T' for non-scheduled users within the pool of N active users, i.e., users not included in the M scheduled users. The projected throughput calculation for non-scheduled users is given as:

$$T'(i,n+1)=(1-\alpha)\cdot T'(i,n) \qquad (3)$$

for i=1, ..., (M-K). Here the rate request indicator is assumed to be zero for calculation of the projected throughput used for updating each PF associated with non-scheduled users.

The updated projected throughput values are used to update PF values. Processing then returns to step 26 wherein the updated PF values are used to continue scheduling any users that still have pending data.

The exemplary embodiment updates the PF values for each user as if each mobile station 16 always has sufficient amount of pending data, and that the rate requested by each mobile station 16 is realizable. Therefore, the scheduling sequence generated by the PF computed as in Equations (1)-(3) is not sensitive to any unpredictable states of the transmission buffers as long as a buffer has at least one bit of data to send.

Figure 3:
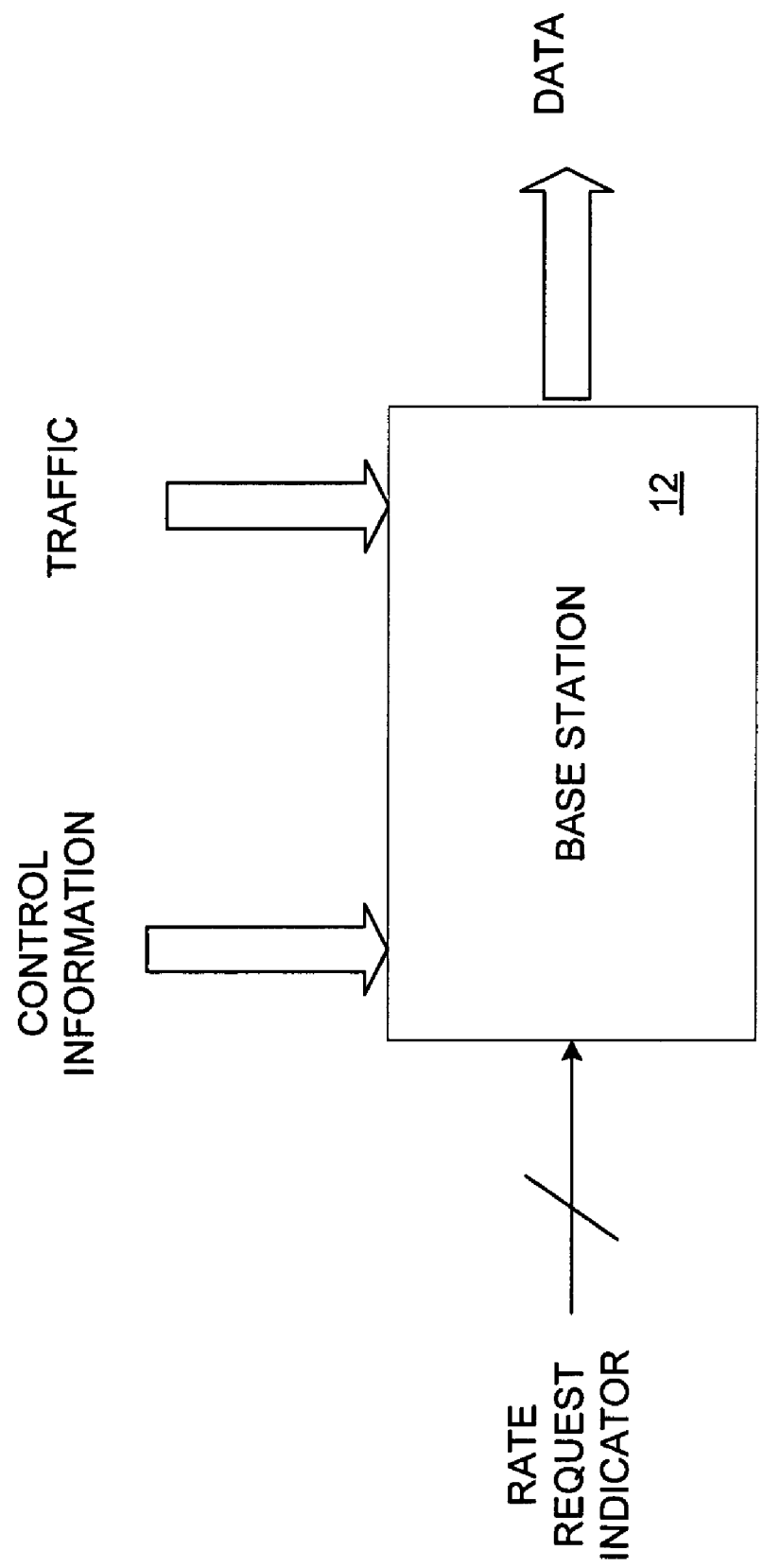
FIG. 3 illustrates in block diagram form a base station as in FIG. 1 according to one embodiment.

FIG. 3 further details base station 12, including signals received, processed, and transmitted. As illustrated, base station 12 receives a rate request indicator, such as DRR or C/I, from multiple mobile stations 16. Control information is received from at least the mobile stations 16, and also may be received from a central controller, such as a Base Station Controller (BSC) (not shown). The base station receives traffic, referred to as "backbone traffic," from a network (not shown), such as the Internet. In response to these signals, base station 12 transmits data to mobile stations 16.

Figure 4:
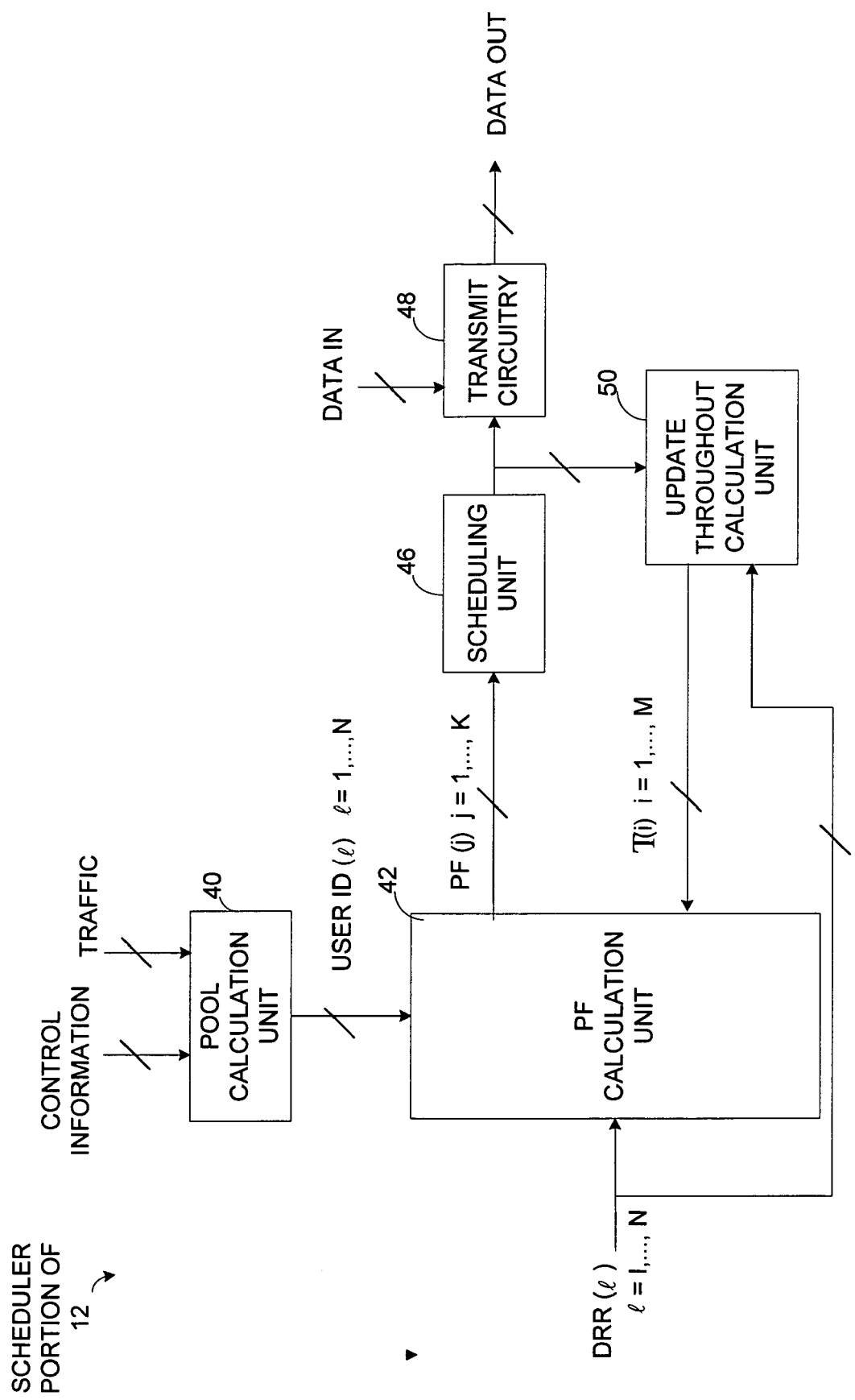
FIG. 4 illustrates in block diagram form a portion of a base station as in FIG. 3 according to one embodiment.

FIG. 4 further details a scheduler portion of base station 12. Base station 12 includes a pool calculation unit 40 for determining the number and identification of mobile stations 16 active at a given time. Active mobile stations 16 communicate with base station 12, but may not have any pending data transactions. The pool calculation unit 40 receives control information from the mobile stations 16 and the BSC (not shown), and also receives traffic from a network (not shown).

In response, the pool calculation unit 40 provides user identification information, User ID(l) for l=1, ..., N, to a PF calculation unit 42. The user identification information is provided for all N active users in system 10.

The PF calculation unit 42 receives data rate request indicators from the mobile stations 16, such as DRR(l). The PF calculation unit 42 uses the rate request indicator to determine a PF for each user according to Equation (1). The PF(j) for all users having pending data j=1, ..., K are provided to a scheduling unit 46. The scheduling unit 46 determines a schedule among the various users associated with PF(j). The scheduling unit 46 provides the schedule information to transmit circuitry 48. DATA IN is also provided to transmit circuitry 48, which transmits the data according to the schedule information to produce DATA OUT. The schedule information is also provided to a calculation unit 50 which updates the projected throughput of the active N users. The scheduled users are updated according to Equation (2), while the non-scheduled users are updated according to Equation (3). For updating the projected throughput values, the calculation unit 50 receives rate request indicators for mobile stations 16. The updated projected throughput values for the subset of M users with pending data are then provided back to the PF calculation unit 42 to update the PF values. The calculation unit 50 includes a smoothing filter, such as an Infinite Impulse Response (IIR) filter. The tap coefficients for the smoothing filter are configurable.

In one example, a mobile station 16 has a velocity of 3 km/hr and experiences a doppler frequency, $f_{doppler}$, of 5.4 Hz. Projected throughput(s) are subject to IIR smoothing filtering according to Equations (2) and (3) with a time constant, $T_W$, given as approximately, is 2 sec. The IIR filter tap coefficient, $\alpha$, is related to time constant $T_W$ by a relation given as:

$$\alpha = \frac{1}{T_W \cdot \left(\frac{\text{frames}}{\text{sec.}}\right)}, \quad (4)$$

resulting in a time constant of 1/100 given a frame duration of 20 msec., i.e., 50 frames/sec. In general calculation of $\alpha$ involves first determining a quality of service for the transmissions reflecting a fairness constraint wherein each mobile station 16 is allocated a time fraction within a predetermined tolerance. The calculation then optimizes $\alpha$ to achieve optimum real system throughput.

Thus, a novel and improved method and apparatus for scheduling packet data transmissions in a wireless communication system has been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software modules could reside in RAM memory, flash memory, ROM memory, EPROM memory, EEPROM memory, registers, hard disk, a removable disk, a CD-ROM, or any other form of storage medium known in the art. The processor may reside in an ASIC (not shown). The ASIC may reside in a telephone (not shown). In the alternative, the processor may reside in a telephone. The processor may be implemented as a combination of a DSP and a microprocessor, or as two microprocessors in conjunction with a DSP core, etc.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method of wireless communications comprising:
   receiving rate request indicators for a plurality of mobile stations, each of the rate request indicators being related to a quality of a transmission channel to one of the mobile stations;
   calculating priority functions for the plurality of mobile stations in response to the rate request indicators; and
   scheduling transmission times to the mobile stations according to the priority functions.

2. The method of claim 1, further comprising:
   calculating projected throughput values for the plurality of mobile stations as a function of the rate request indicators; and
   updating the priority functions in response to the projected throughput values.

3. The method of claim 2, wherein each priority function is calculated as a rate request indicator divided by a projected throughput value for each of the plurality of mobile stations.

4. The method of claim 1, wherein each of the rate request indicators is a data rate request received from one of the plurality of mobile stations.

5. The method of claim 1, wherein each of the rate request indicators is a carrier-to-interference ratio received from one of the plurality of mobile stations.

6. The method of claim 1, further comprising:
   transmitting data to the plurality of mobile stations in response to scheduling transmissions.

7. The method of claim 1, further comprising:
updating the priority functions of scheduled mobile stations as a function of the rate request indicator.

8. The method of claim 7, comprising:
updating the priority functions of non-scheduled mobile stations using zero as the rate request indicator.

9. A wireless apparatus, comprising:
a priority function calculation unit for receiving rate request indicators from mobile stations and generate priority function values in response, each of the rate request indicators being related to a quality of a transmission channel to one of the mobile stations; and
a scheduling unit coupled to the priority function calculation unit, the scheduling unit for scheduling transmission times to the mobile stations according to the priority function values.

10. The wireless apparatus of claim 9, further comprising:
a throughput calculation unit coupled to the scheduling unit and for receiving the rate request indicators from mobile stations and generate projected throughput values as a function of the rate request indicators,
the priority function calculation unit for updating priority function values based on the projected throughput values.

11. The wireless apparatus of claim 10, wherein the throughput calculation unit comprises a smoothing filter.

12. The wireless apparatus of claim 11, wherein the smoothing filter is an Infinite Impulse Response filter.

13. The wireless apparatus of claim 10, the throughput calculation unit for generating projected throughput values for non-scheduled mobile stations using zero as the rate request indicator.

14. A method for scheduling packet data transactions in a wireless communication system, comprising:
determining a pool of users;
calculating a priority function of at least a portion of the pool of users;
scheduling a first set of users having pending data transactions from said at least a portion of the pool of users;
receiving rate request indicators from said at least a portion of the pool of users, each of the rate request indicators being related to the quality of a transmission channel to one of said at least a portion of the pool of users; and
updating priority functions of the first set of users in response to the rate request indicators, the updated priority functions being used to schedule transmission times for each of the first set of users.

15. The method of claim 14, further comprising:
updating a second set of users within said at least a portion of the pool of users different from the first set of users using zero as the rate request indicator.

16. The method as in claim 14, wherein said at least a portion of the pool of users are users having pending data.

17. The method as in claim 16, wherein the first set of users comprises one user.

18. A wireless communications apparatus comprising:
means for receiving rate request indicators for a plurality of mobile stations, each of the rate request indicators being related to a quality of a transmission channel to one of the mobile stations;
means for calculating priority functions for the plurality of mobile stations in response to the rate request indicators; and
means for scheduling transmission times to the mobile stations according to the priority functions.

19. The apparatus of claim 18, further comprising:
means for calculating projected throughput values for the plurality of mobile stations as a function of the rate request indicators; and
means for updating the priority functions in response to the projected throughput values.

20. The apparatus of claim 19, wherein each priority function is calculated as a rate request indicator divided by a projected throughput value for each of the plurality of mobile stations.

21. The apparatus of claim 18, wherein each of the rate request indicators is a data rate request received from one of the plurality of mobile stations.

22. The apparatus of claim 18, wherein each of the rate request indicators is a carrier-to-interference ratio received from one of the plurality of mobile stations.

23. The apparatus of claim 18, further comprising:
means for transmitting data to the plurality of mobile stations in response to scheduling transmissions.

24. The apparatus of claim 1, further comprising:
means for updating the priority functions of scheduled mobile stations as a function of the rate request indicator.

25. The apparatus of claim 24, comprising:
means for updating the priority functions of non-scheduled mobile stations using zero as the rate request indicator.

26. A computer product storage media being a non-transitory signal comprising processor-executable instructions encoded thereon for:
receiving rate request indicators for a plurality of mobile stations, each of the rate request indicators being related to a quality of a transmission channel to one of the mobile stations;
calculating priority functions for the plurality of mobile stations in response to the rate request indicators; and
scheduling transmission times to the mobile stations according to the priority functions.

27. The computer product storage media being a non-transitory signal of claim 26, further comprising processor-executable instructions encoded thereon for:
calculating projected throughput values for the plurality of mobile stations as a function of the rate request indicators; and
updating the priority functions in response to the projected throughput values.

* * * * *